Oct. 9, 1934.      R. CUSHMAN      1,975,927
ROLLER CONVEYER
Filed March 9, 1931      2 Sheets-Sheet 1

Inventor,
Robert Cushman,
by Roberts Cushman & Woodbury.
his Attys.

Oct. 9, 1934.   R. CUSHMAN   1,975,927
ROLLER CONVEYER
Filed March 9, 1931   2 Sheets-Sheet 2

Inventor,
Robert Cushman,
by Roberts, Cushman & Woodbury.
his Attys.

Patented Oct. 9, 1934

1,975,927

UNITED STATES PATENT OFFICE 1,975,927

ROLLER CONVEYER

Robert Cushman, Boston, Mass., assignor to The Lamson Company, Syracuse, N. Y., a corporation of Massachusetts Application March 9, 1931, Serial No. 521,116

1 Claim. (Cl. 198—127)

This invention relates to roller conveyers, and particularly to so-called "live roller" conveyers, in which the load carrying rollers are driven and so propel the load supported on the rollers by the rotation of the rollers, as distinguished from roller gravity conveyers, in which the rollers are idlers arranged on an incline to permit the load to travel along the conveyer by gravity.

Live roller conveyers having the rollers driven by a continuous belt held in frictional driving engagement with the rollers are well known and present no difficulties in the case of a straight conveyer or conveyer section. A different problem arises in driving the rollers on a curved conveyer or conveyer section, because the usual flat driving belt of greater width than its thickness can not be bent or curved laterally in the direction of its width to follow the curve of the conveyer and still remain flat as it does on a straight run. Various special driving mechanisms for driving the rollers at a curve have been employed. For example, it has been proposed to drive live rollers on a curved conveyer by interconnecting the rollers with gearing, an obviously costly and unsatisfactory expedient. It has also been proposed to drive live rollers on a curved track by a rope or cable which will bend in any direction and may therefore follow a bend in the track; but a relatively wide, flat belt, with its relatively greater frictional contact surface, is preferable to a rope drive.

The object of the present invention is to provide for driving live rollers on curved conveyers by means of a flat belt, thereby eliminating more complicated and costly driving mechanisms, simplifying the structure of curved live roller conveyers, and retaining at curves the advantages of a flat belt drive which have been enjoyed in straight conveyers. The term flat belt is herein used in its ordinary sense to denote a belt of substantially greater width than depth, as distinguished from a rope or cable. Such a belt can not be curved laterally in the plane or direction of its width without crimping or forming slack on the inner edge of the curve, and the present invention provides for the taking up of the slack and the holding of the belt in flatwise driving engagement with the live rollers on a curved conveyer.

Figure 1:
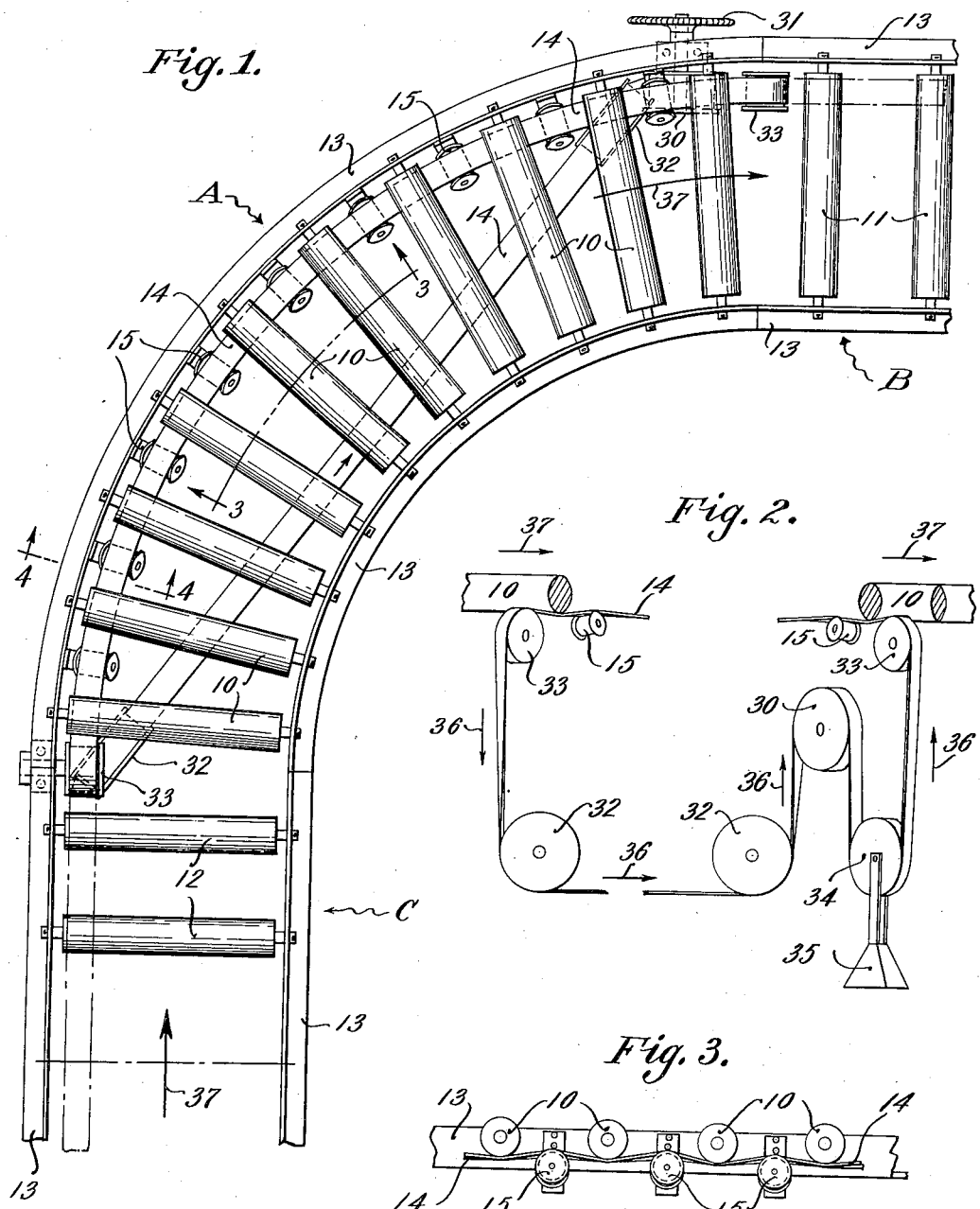
Fig. 1 is a plan view of a part of a live roller conveyer having a curved section whose load supporting rollers are driven by a belt in accordance with this invention.

In the drawings the reference character A designates a curved conveyer section connecting two straight sections B and C. These sections comprise rollers 10, 11 and 12, respectively, suitably supported at opposite ends in side rails 13.

The rollers 10 of curved section A are live rollers driven by a flat belt 14, which, in the illustrated embodiment, has a frictional engagement with each roller 10. Interposed between each two adjacent rollers 10 is an idler roller 15 which is mounted upon an upwardly inclined stud shaft 16 supported at its lower end on a bracket 17 secured to and depending from the outer side rail 13. The end of the shaft 16 passes through a slot 18 and is held in place by a nut 19. A washer 20 on the shaft 16 spaces the roller 15 from the bracket 17. At the ends of the roller 15 are provided flanges 21, 22 between which the belt 14 travels. The inclined idler rollers 15 between the several load supporting live rollers hold the flat belt in flatwise frictional driving engagement with the under sides of the adjacent live rollers 10, 10 throughout the width of the belt, and take up the slack of the flat belt at its inner edge as it passes around the curve. The extent of the circumferential contact of the flat belt with the live rollers may be varied by adjusting the shaft 16 of the idler roller 15 up or down on bracket 17.

Figure 2:
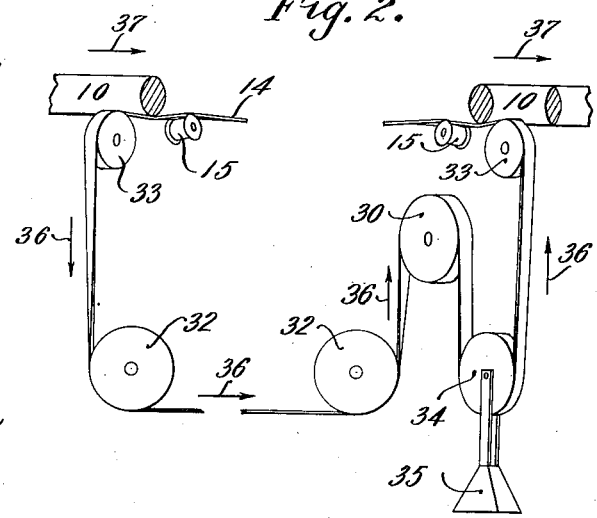
Fig. 2 is a diagrammatic view illustrating one manner in which the belt may be driven.
Figure 3:
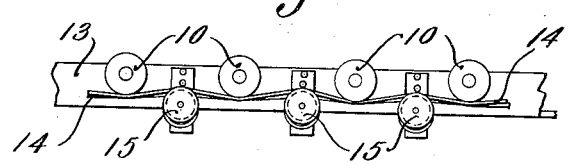
Fig. 3 is a section on line 3—3 of Fig. 1.
Figure 4:
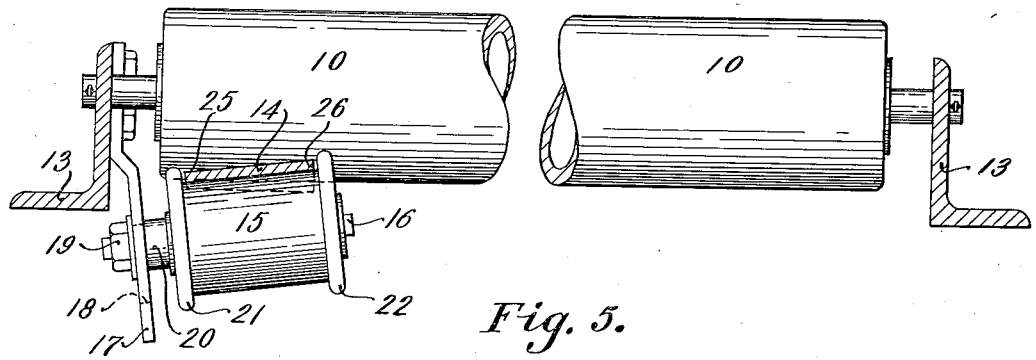
Fig. 4 is a section on line 4—4 of Fig. 1, on an enlarged scale.
Figure 5:
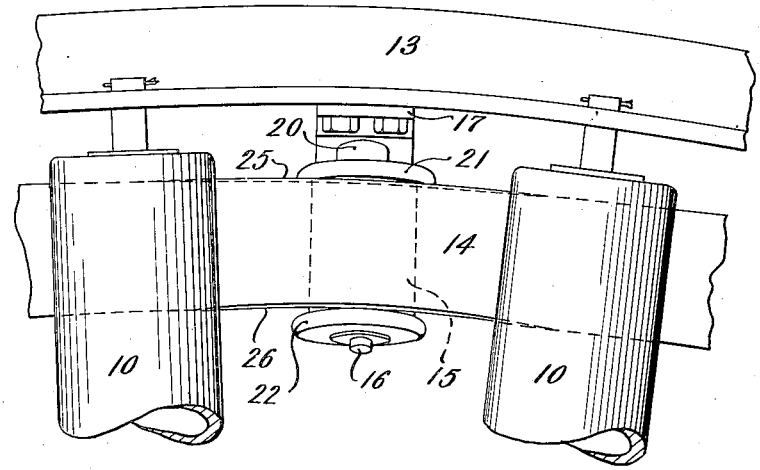
Fig. 5 is a plan view, on an enlarged scale, illustrating the relation between two live rollers, an intermediate idler roller and the driving belt, on a curved conveyer.

In Fig. 2 is shown one way of actuating the belt 14 by a pulley 30 driven by a sprocket wheel 31, fixed pulleys 32, 33, and take up pulley 34 provided with a weight 35 to keep the belt taut as it passes over the idler rollers 15 and under the live rollers 10. When the belt is driven in the direction indicated by the arrows 36 the load is advanced by the rollers 10 in the direction indicated by the arrows 37.

The straight sections B and C of the conveyer or either of them may be inclined so that the loads travel thereon by gravity or may be horizontal. If horizontal the rollers 11 and 12 may be live rollers driven by any suitable means either independent of the belt 14 or by extensions of that belt as indicated in dot and dash lines in Fig. 1. When desired the rollers 11 and 12 of the horizontal sections may be free and the loads caused to travel thereover by the application of force manually or otherwise.

Figure 6:
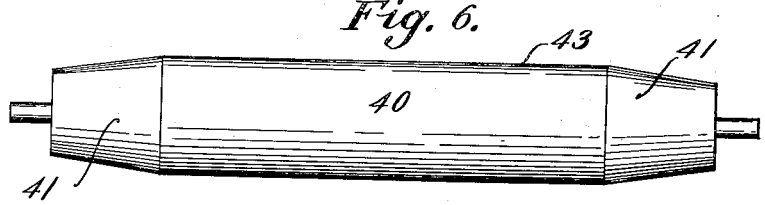
Figs. 6 and 7 are elevations of modified forms of live rollers having conical instead of cylindrical belt engaging surfaces.
Figure 7:
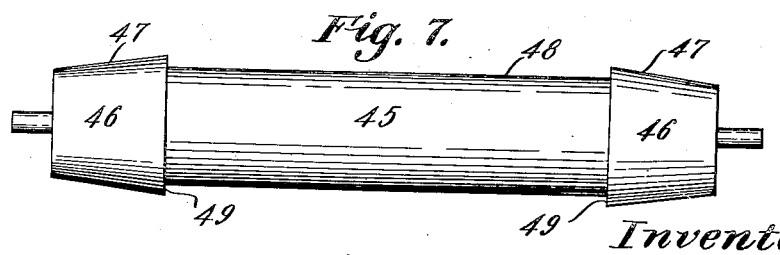

Figs. 6 and 7 illustrate two forms of rollers which might, if desired, be substituted for the rollers 10. In each form the part of the roller with which the flat belt contacts is the frustum of a cone the smaller end being toward the outer edge of the curve. When either of these forms of rollers is employed the slack resulting from the lateral bending of the belt is to a large extent taken up by the frusto-conical portion and the intermediate idler rollers would require little or no inclination.

While certain embodiments only of the invention have been shown and described it will be understood that I am not limited thereto and that other embodiments may be made without departing from the spirit and scope of the invention as set forth in the following claim.

I claim:

A curved, live roller conveyer comprising a series of load supporting and transporting live rollers, a flat belt for driving the live rollers, the belt being curved laterally in the direction of its width to follow the curve of the conveyer, and idler rollers between live rollers for holding the belt in flatwise driving engagement throughout its width with the live rollers on the curve, the idler rollers being journaled on axes inclined to the axes of the live rollers so as to take up the slack of the flat belt at its inner edge as it passes around the curve and the live rollers having frusto-conical surfaces with which the belt is in engagement.

ROBERT CUSHMAN.